United States Patent
Hosohara et al.

(10) Patent No.: US 11,821,691 B2
(45) Date of Patent: Nov. 21, 2023

(54) GAS INJECTION NOZZLE REFRACTORY AND GAS INJECTION NOZZLE

(71) Applicants: JFE STEEL CORPORATION, Tokyo (JP); SHINAGAWA REFRACTORIES CO., LTD., Tokyo (JP)

(72) Inventors: Seiji Hosohara, Tokyo (JP); Atsuhisa Iida, Tokyo (JP); Atsushi Torigoe, Tokyo (JP); Ryoma Fujiyoshi, Tokyo (JP)

(73) Assignees: JFE STEEL CORPORATION, Tokyo (JP); SHINAGAWA REFRACTORIES CO., LTD., Tokyo (JP)

( * ) Notice: Subject to any disclaimer, the term of this patent is extended or adjusted under 35 U.S.C. 154(b) by 235 days.

(21) Appl. No.: 17/277,149

(22) PCT Filed: Sep. 19, 2019

(86) PCT No.: PCT/JP2019/036776
§ 371 (c)(1),
(2) Date: Mar. 17, 2021

(87) PCT Pub. No.: WO2020/059801
PCT Pub. Date: Mar. 26, 2020

(65) Prior Publication Data
US 2022/0003500 A1    Jan. 6, 2022

(30) Foreign Application Priority Data
Sep. 21, 2018  (JP) .................................. 2018-177127

(51) Int. Cl.
*F27D 3/16*        (2006.01)
*C21C 5/34*        (2006.01)
(Continued)

(52) U.S. Cl.
CPC ................ *F27D 3/16* (2013.01); *C21C 5/34* (2013.01); *C21C 5/48* (2013.01);
(Continued)

(58) Field of Classification Search
CPC .... C21C 5/34; C21C 5/35; C21C 5/48; C21C 7/072; F27D 3/16; F27D 2003/169; C04B 2235/3206
(Continued)

(56) References Cited

U.S. PATENT DOCUMENTS 4,306,030 A * 12/1981 Watanabe ............... C04B 35/44
501/99
4,431,745 A *  2/1984 Watanabe ............. C04B 35/013
501/109

(Continued)

FOREIGN PATENT DOCUMENTS

CN    108138247 A    6/2018
EP    3 037 558 A1   6/2016
(Continued)

OTHER PUBLICATIONS

Mar. 3, 2022 Office Action issued in Chinese Patent Application No. 201980061859.4.
(Continued)

*Primary Examiner* — Scott R Kastler
*Assistant Examiner* — Michael Aboagye
(74) *Attorney, Agent, or Firm* — Oliff PLC

(57) ABSTRACT

A gas injection nozzle refractory with one or more gas injection small metal tubes buried therein has improved durability. The gas injection nozzle refractory includes a MgO—C central refractory with a small metal tube buried therein, and a MgO—C peripheral refractory surrounding the central refractory. The central refractory on a plane of the gas injection nozzle refractory has an external shape of a (Continued)

circle with a radius in the range of R+10 to R+150 mm concentric with a virtual circle with a minimum radius surrounding all buried small metal tubes, R mm being a radius of the virtual circle.

12 Claims, 1 Drawing Sheet

(51) Int. Cl.
    *C21C 5/48*     (2006.01)
    *F27D 27/00*     (2010.01)

(52) U.S. Cl.
    CPC .. *F27D 2003/161* (2013.01); *F27D 2003/169* (2013.01); *F27D 2027/002* (2013.01)

(58) Field of Classification Search
    USPC ..................... 266/47, 225, 265, 268; 373/85
    See application file for complete search history.

(56) References Cited

U.S. PATENT DOCUMENTS

| | | | | |
|---|---|---|---|---|
| 4,735,400 A | * | 4/1988 | Tate | ............ B22D 1/005 |
| | | | | 373/146 |
| 5,171,511 A | * | 12/1992 | Sharma | ............ C21C 5/5217 |
| | | | | 266/224 |
| 8,093,169 B2 | * | 1/2012 | Tanaka | ............ C04B 35/043 |
| | | | | 266/283 |
| 2015/0353426 A1 | * | 12/2015 | Tanaka | ............ C04B 35/013 |
| | | | | 501/87 |

FOREIGN PATENT DOCUMENTS

| | | | | |
|---|---|---|---|---|
| JP | S58-15072 | A | | 1/1983 |
| JP | S59-31810 | A | | 2/1984 |
| JP | U61-043248 | | | 3/1986 |
| JP | S63-24008 | A | | 2/1988 |
| JP | H06220517 | | * 8/1994 | ............ C04B 35/04 |
| JP | 2000-212634 | A | | 8/2000 |
| JP | 3201678 | B2 | | 8/2001 |
| JP | 2002-249371 | A | | 9/2002 |
| JP | 2003-231912 | A | | 8/2003 |
| JP | 2012-229487 | A | | 11/2012 |
| JP | 2013-245384 | A | | 12/2013 |
| JP | 2016-188411 | A | | 11/2016 |
| JP | 2016-199788 | A | | 12/2016 |
| JP | 2019-77934 | A | | 5/2019 |
| KR | 101680234 | B1 | | 12/2016 |
| TW | 201632631 | A | | 9/2016 |

OTHER PUBLICATIONS

Apr. 10, 2020 Office Action issued in Taiwanese Patent Application No. 108134045.
Jul. 2, 2021 Extended European Search Report issued in European Patent No. 19861605.4.
May 26, 2022 Office Action issued in Korean Patent Application No. 10-2021-7007756.
Nov. 19, 2019 International Search Report issued in International Application No. PCT/JP2019/036776.
Oct. 18, 2022 Office Action issued in Chinese Patent Application No. 201980061859.4.
Hu, Kaiyan et al., "Effects of Additives on Hydration Resistance of Low Carbon Magnesia-Carbon Brick", Refractory Materials, vol. 44, Issue 3, pp. 213-216 (2010).
Jan. 18, 2023 Office Action issued in Chinese Patent Application No. 201980061859.4.

* cited by examiner

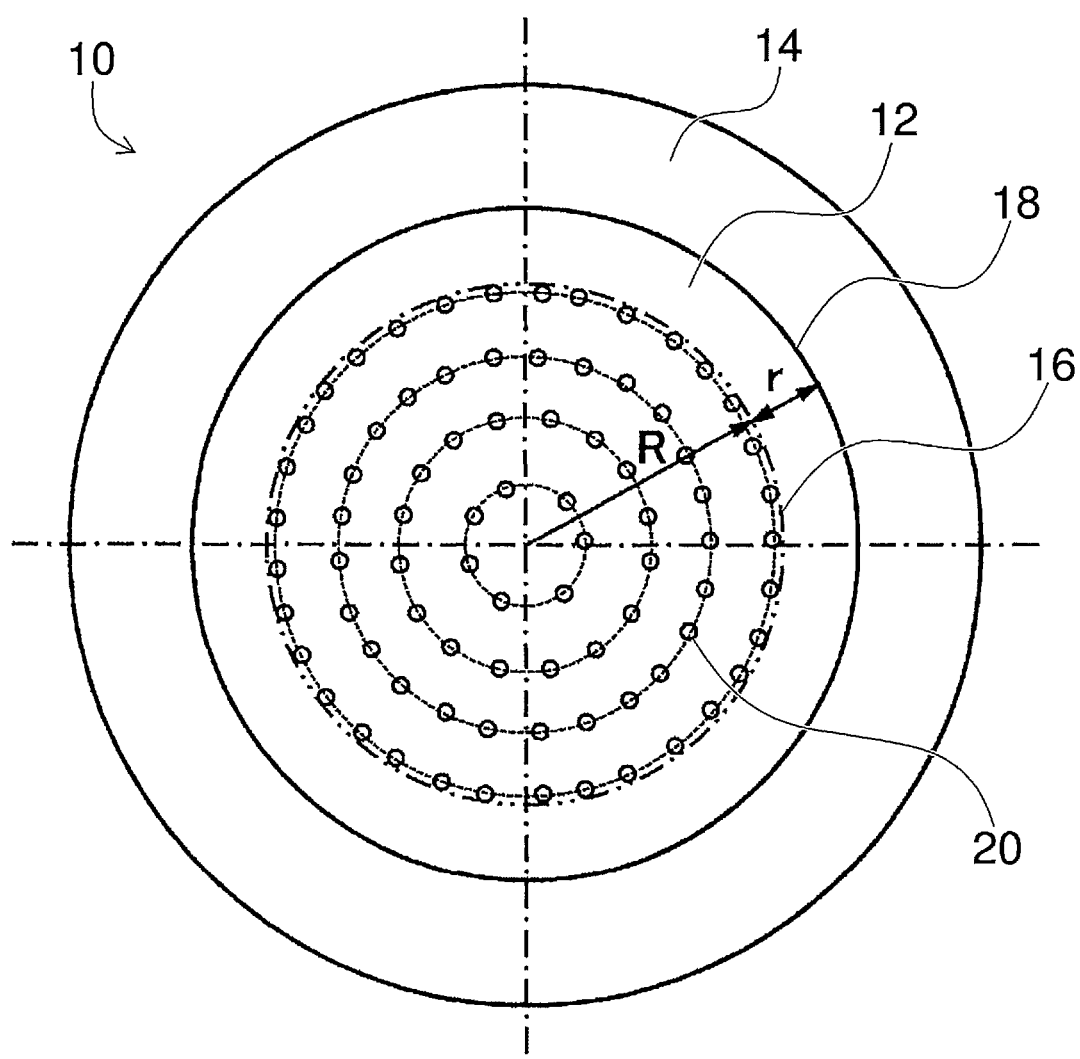

GAS INJECTION NOZZLE REFRACTORY AND GAS INJECTION NOZZLE

TECHNICAL FIELD

This application relates to a refractory for a gas injection nozzle for injecting a gas into a melt from a furnace bottom or the like, the gas injection nozzle refractory having one or more small gas injection metal tubes buried in a carbon-containing refractory, and a gas injection nozzle including the refractory.

BACKGROUND

In converters and electric arc furnaces, bottom blowing is performed in which a stirring gas (typically an inert gas, such as nitrogen or argon) or a refining gas is injected into a melt from a furnace bottom to improve refining efficiency and alloy yield. The bottom blowing method includes the following methods (1) to (3).
 (1) A double tube method of injecting oxygen for decarbonization from an inner tube and injecting a hydrocarbon gas (propane, etc.) for cooling a molten steel contact portion from an outer tube.
 (2) A method of injecting an inert gas through a slit-like opening formed between a metal tube and a brick (a slit method).
 (3) A method of burying a plurality of (several to hundreds of) small metal tubes in a carbon-containing brick, supplying an inert gas to the small metal tubes from the bottom of the brick through a gas-inlet tube and a gas reservoir, and injecting the inert gas through the small metal tubes.

In the methods (1) and (2), it is common to produce a tuyere brick in advance by a routine method, to process an installation portion of a double tube or a metal tube forming a slit, to divide a tuyere brick into two or four parts to form a space for installing a metal tube, to set a gas injection metal tube in advance, and to place a tuyere brick around the metal tube.

A gas injection plug (nozzle) used in the method (3) is referred to as a multiple hole plug (hereinafter referred to as MHP). Patent Literature 1 discloses that a MHP can be controlled at a gas flow rate in the range of 0.01 to 0.20 $Nm^3/(min \cdot t)$. Thus, MHPs are easier to be adopted than the double tube method or the slit method.

MHPs have a structure in which a plurality of small metal tubes coupled to a gas reservoir are buried in a carbon-containing refractory, such as a magnesia-carbon brick. Unlike nozzles in the double tube method or the slit method, MHPs are produced by the following method. A raw material containing an aggregate, such as a magnesia raw material, a carbon source, such as flake graphite, and a binder, such as pitch, a metal species, or a phenolic resin, is kneaded by a kneading means, such as a high-speed mixer with high dispersion performance, to prepare a mixture for a carbon-containing refractory in which small metal tubes are to be buried.

Small metal tubes are laid on and buried in the mixture in a layered form. The mixture is shaped with a pressing machine at a predetermined pressure and is then subjected to predetermined heat treatment, such as drying or firing. The small metal tubes are then bonded by welding to a gas reservoir component. Thus, a MHP is produced.

Alternatively, after small metal tubes are bonded by welding to a gas reservoir component in advance, the mixture is supplied to the periphery of the small metal tubes, is shaped with a pressing machine at a predetermined pressure, and is then dried in a predetermined manner. Thus, a MHP is produced.

Bottom blowing nozzles are more greatly damaged (wore) than refractories, such as furnace walls, and are important components that influence the life of furnaces. Thus, various proposals have been made to reduce the damage. The following improvements have also been proposed for MHPs. Patent Literature 2 discloses that a gas injection nozzle portion of a MHP and a peripheral tuyere can be integrated to reduce prior erosion and abrasion from a joint. However, this technique is not sufficiently effective and cannot be an effective measure.

The following proposals have been made as measures against lowered melting points of small metal tubes buried in a refractory due to carburization (prior damage to small metal tubes). Patent Literature 3 discloses that an oxide layer is formed by thermal spraying on the surface of small stainless steel tubes buried in a carbon-containing refractory, such as magnesia-carbon, to suppress carburization of the small tubes. In smelting furnaces used for extended periods (for example, for two to six months), such as converters, however, there is a problem that the oxide layer has an insufficient thickness and has a small effect of suppressing carburization.

Patent Literature 4 discloses that a refractory sintered body is placed between a small metal tube and a carbon-containing refractory to suppress carburization of the small metal tube. Although this technique has an effect of suppressing carburization, in nozzles with a large number of small metal tubes buried therein, it is difficult to place a refractory sintered body in the narrow space between the small metal tubes. It is therefore difficult to put this technique to practical use.

Alternatively, a method of temporarily subjecting a carbon-containing refractory to reduction firing and then impregnating the carbon-containing refractory with an organic substance is adopted in the following proposals. Patent Literature 5 discloses that the hot strength and corrosion resistance of a magnesia-carbon brick to which a metal Al powder is added can be improved by firing the magnesia-carbon brick at 500° C. to 1000° C. and then impregnating the pores of the brick with an organic substance with a carbonization yield of 25% or more. Patent Literature 6 discloses that the thermal spalling resistance of a magnesia-carbon brick to which 0.5% to 10% by weight of calcined anthracite is added can be improved by subjecting the magnesia-carbon brick to reduction firing at 600° C. to 1500° C. to reduce the elastic modulus of the magnesia-carbon brick. It is also disclosed that the fired magnesia-carbon brick may be impregnated with tar, which can improve the sealing of pores and improve the strength and slaking resistance of the magnesia-carbon brick. However, these techniques are not sufficiently effective and cannot be effective measures.

CITATION LIST

Patent Literature

PTL 1: Japanese Unexamined Patent Application Publication No. 59-31810
PTL 2: Japanese Unexamined Patent Application Publication No. 63-24008
PTL 3: Japanese Unexamined Patent Application Publication No. 2000-212634

PTL 4: Japanese Unexamined Patent Application Publication No. 2003-231912
PTL 5: Japanese Unexamined Patent Application Publication No. 58-15072
PTL 6: Japanese Patent No. 3201678

SUMMARY

Technical Problem

To improve the durability of gas injection nozzles (MHPs, etc.) with small metal tubes buried in carbon-containing refractories, various studies have been made on the material and structure of the refractories, but sufficient improvement effects have not been obtained. Accordingly, it is an object of the disclosed embodiments to solve such problems of the related art and to provide a high-durability gas injection nozzle refractory with one or more small gas injection metal tubes buried in a carbon-containing refractory.

Solution to Problem

It has been supposed that the causes of damage to MHPs used in converters and electric arc furnaces are mainly erosion and abrasion due to a molten steel flow near the working surface of nozzles, because gas is ejected into the MHPs from small metal tubes. The measure of Patent Literature 2 is based on this supposition. It has also been supposed that prior wear of small metal tubes due to carburization or the like increases damages. Thus, carburization of small metal tubes has been prevented by methods as described in Patent Literature 3 and Patent Literature 4. It has also been supposed that a vigorously blown inert gas while blowing cools a refractory, and a temperature difference between blowing and non-blowing causes spalling damage. It has also been supposed that carbon-containing refractories have the lowest strength at approximately 600° C., at which the working surface is cracked and damaged. Due to such various ways of supposition, no conclusion was reached. Consequently, sufficient measures have not been taken, and the durability has not always been satisfactory, as described above.

To investigate true causes of damage to MHPs, the present inventors collected MHPs that had been used in actual furnaces and examined in detail the refractory microstructure near the working surface of nozzles. The results show that a very large temperature change in the range of 500° C. to 600° C. was caused inside the refractory at a depth in the range of approximately 10 to 20 mm from the working surface, and a crack parallel to the working surface appeared in this portion. From repeated detailed investigations of the vicinity of the working surface of the MHPs used in the actual furnaces, it was concluded that the MHPs were not damaged by erosion or abrasion but were mainly damaged by a thermal shock caused by a steep temperature gradient near the working surface.

As a result of extensive studies to improve a material to reduce thermal stress in tuyere refractories, the present inventors found that it is effective to use refractories with high thermal conductivity (the high thermal conductivity results in a decreased temperature gradient) by a high C content and with a low thermal expansion coefficient. A high C content, however, results in a significant decrease in abrasion resistance and erosion resistance, and abrasion or erosion by molten metal significantly shortens the life of the refractories. Further investigations showed that the problems can be solved by providing a MgO—C material with a high C content in a neighboring portion (a central portion in a predetermined region) of the most cooled small metal tube and providing a MgO—C material with a normal C content in the periphery (peripheral portion) of the neighboring portion.

More specifically, the refractory (MgO—C material) with the normal C content in the peripheral portion reduces the decrease in abrasion resistance and erosion resistance. On the other hand, the refractory (MgO—C material) with the high C content, high thermal conductivity, and a low thermal expansion coefficient in the neighboring portion of the small metal tube reduces the occurrence of cracks caused by thermal shock. It was also found that the refractory with the high thermal conductivity is cooled by the gas flowing through small metal tubes, and a solidified layer or a solidified body of slag or metal (which is generally referred to as a "mushroom" and is hereinafter also referred to as a "mushroom") is formed on the working surface side. The mushroom isolates (protects) the refractory surface from molten steel and effectively reduces wear due to abrasion and erosion.

The disclosed embodiments are based on such findings and are summarized as follows:

[1] A gas injection nozzle refractory with one or more small gas injection metal tubes buried in a carbon-containing refractory, comprising: a central refractory with the small metal tubes buried therein; and a peripheral refractory surrounding the central refractory, wherein the central refractory on a plane of the gas injection nozzle refractory has an external shape of a circle with a radius in the range of R+10 to R+150 mm concentric with a virtual circle with a minimum radius surrounding all the buried small metal tubes, R mm being a radius of the virtual circle, the central refractory is a MgO—C refractory with a carbon content in the range of 40% to 80% by mass, a metal Al content in the range of 3% to 8% by mass, and a mass ratio of a metal Si content to the metal Al content in the range of 0.30 to 1.0, and the peripheral refractory is a MgO—C refractory with a carbon content in the range of 10% to 25% by mass.

[2] The gas injection nozzle refractory according to [1], wherein the central refractory has an external shape of a circle with a radius in the range of R+40 to R+70 mm concentric with the virtual circle.

[3] The gas injection nozzle refractory according to [1] or [2], wherein the central refractory is a MgO—C refractory with a carbon content in the range of 40% to 80% by mass, a metal Al content in the range of 5% to 7% by mass, and a mass ratio of a metal Si content to the metal Al content in the range of 0.30 to 1.0.

[4] The gas injection nozzle refractory according to Claim [1] or [2], wherein the central refractory is a MgO—C refractory with a carbon content in the range of 40% to 80% by mass, a metal Al content in the range of 5% to 7% by mass, and a mass ratio of a metal Si content to the metal Al content in the range of 0.30 to 0.45.

[5] A gas injection nozzle comprising the gas injection nozzle refractory according to any one of [1] to [4].

Advantageous Effects

A gas injection nozzle refractory according to the disclosed embodiments has fewer cracks due to thermal shock and has high durability. Thus, a gas injection nozzle refractory according to the disclosed embodiments can provide a long-life gas injection nozzle refractory with a low damage rate.

BRIEF DESCRIPTION OF THE DRAWINGS

FIG. 1 is a plan view of a gas injection nozzle refractory 10 according to an embodiment.

DETAILED DESCRIPTION

A gas injection nozzle refractory according to the disclosed embodiments is a gas injection nozzle refractory 10 with one or more small gas injection metal tubes 20 buried in a carbon-containing refractory. The gas injection nozzle refractory 10 includes a central refractory 12 with the small metal tubes 20 buried therein and a peripheral refractory 14 surrounding the central refractory 12.

As described above, the main cause of the wear of MHP tuyeres is thermal shock. In particular, the neighboring portion of the small metal tubes 20 of the MHP tuyere is cooled by the gas flowing through the small metal tubes 20 and therefore has high thermal stress. It is effective to increase the C content of a MgO—C refractory to reduce thermal shock or thermal stress. A MgO—C refractory with an increased C content, however, is easily dissolved in molten steel and has lower abrasion resistance and erosion resistance. The present inventors have found in this respect that the neighboring portion of the small metal tubes 20 with an increased C content is cooled by the gas flowing through the small metal tubes 20 due to its high thermal conductivity, a slag or metal mushroom is consequently formed on the working surface side, and the mushroom protects the refractory surface from molten steel and effectively reduces wear due to abrasion or erosion.

Thus, in the disclosed embodiments, the gas injection nozzle refractory 10 is composed of the central refractory 12 with the small metal tubes 20 buried therein and the peripheral refractory 14 surrounding the central refractory 12, and the central refractory 12 is composed of a MgO—C refractory with a high C content. In converters producing various steel grades, however, a mushroom often shrinks or disappears, for example, during continuous production of high-temperature tapping steel. In this case, molten steel comes into contact with the central portion of the tuyere. Measures to prevent the increase in wear rate even in such cases were studied. As a result, it was found that the addition of 3% or more by mass of metal Al, which is usually 1.5% or less by mass (2.5% or less by mass at a maximum) as an antioxidant, and the addition of metal Si at a mass ratio of the metal Si to the metal Al in the range of 0.30 to 1.0 to prevent slaking can significantly improve the resistance to molten steel of the MgO—C refractory and also prevent slaking.

To produce the above effects, the central refractory 12 composed of the MgO—C refractory with the high C content needs to have a predetermined size (external shape) described below.

FIG. 1 is a plan view of a gas injection nozzle refractory 10 according to an embodiment. As illustrated in FIG. 1, the central refractory 12 on a plane (working surface) of the gas injection nozzle refractory 10 has an external shape of a circle 18 with a radius in the range of R+10 to R+150 mm concentric with a virtual circle 16 with a minimum radius surrounding all the buried small metal tubes 20, R (mm) being the radius of the virtual circle 16. In other words, in FIG. 1, the circle 18 forming the external shape of the central refractory 12 has a radius of R+r, wherein r ranges from 10 to 150 mm. When the circle 18 forming the external shape of the central refractory 12 has a radius of less than R+10 mm, the small metal tubes 20 are too close to the boundary between the peripheral refractory 14 and the central refractory 12, and the small metal tubes 20 may be deformed when the refractory is formed. Thus, the circle 18 forming the external shape of the central refractory 12 needs to have a radius of R+10 mm or more. The circle 18 forming the external shape of the central refractory 12 preferably has a radius of R+40 mm or more. When the circle 18 forming the external shape of the central refractory 12 has a radius of more than R+150 mm, however, a portion not covered with the mushroom is formed on the working surface of the central refractory 12 and is damaged when coming into contact with molten steel. Thus, the circle 18 forming the external shape of the central refractory 12 needs to have a radius of R+150 mm or less. The circle 18 forming the external shape of the central refractory 12 preferably has a radius of R+70 mm or less. In other words, in FIG. 1, the circle 18 forming the external shape of the central refractory 12 preferably has a radius of R+r, wherein r ranges from 40 to 70 mm. The plane of the gas injection nozzle refractory 10 herein refers to a surface of the gas injection nozzle refractory 10 that is perpendicular to the axes of the small metal tubes 20.

The MgO—C refractory constituting the central refractory 12 has a carbon content in the range of 40% to 80% by mass. A MgO—C refractory with a carbon content of less than 40% by mass has insufficient thermal shock resistance. A MgO—C refractory with a carbon content of more than 80% by mass has low resistance to molten steel and low reliability. Thus, the MgO—C refractory constituting the central refractory 12 needs to have a carbon content in the range of 40% to 80% by mass.

The MgO—C refractory constituting the central refractory 12 has a metal Al content in the range of 3% to 8% by mass. A MgO—C refractory with a metal Al content of less than 3% by mass has low resistance to molten steel. These effects do not change even if the metal Al content of the MgO—C refractory exceeds 8% by mass. Thus, the MgO—C refractory constituting the central refractory 12 needs to have a metal Al content in the range of 3% to 8% by mass in terms of cost and safety.

The mass ratio of the metal Si content to the metal Al content of the MgO—C refractory ranges from 0.30 to 1.0. When the mass ratio of the metal Si content to the metal Al content of the MgO—C refractory is less than 0.30, the MgO—C refractory has low slaking resistance. When the mass ratio of the metal Si content to the metal Al content of the MgO—C refractory exceeds 1.0, the resistance to molten steel decreases. Thus, the mass ratio of the metal Si content to the metal Al content of the MgO—C refractory constituting the central refractory 12 needs to range from 0.30 to 1.0. Metal Si is oxidized to $SiO_2$ when the refractory is exposed to air for extended periods, for example, due to an accidental shutdown of the equipment. When Si becomes $SiO_2$, the strength of the refractory is decreased due to a low-melting-point substance formed between $SiO_2$ and MgO or $Al_2O_3$. Thus, the metal Si content is preferably decreased, provided that slaking resistance is exhibited. The mass ratio of the metal Si content to the metal Al content of the MgO—C refractory preferably ranges from 0.30 to 0.45. A MgO—C refractory with a metal Al content in the range of 5% to 7% by mass can have further improved resistance to molten steel.

The MgO—C refractory constituting the peripheral refractory 14 has a carbon content in the range of 10% to 25% by mass. A MgO—C refractory with a carbon content of less than 10% by mass increases damage due to thermal shock. Thus, the MgO—C refractory constituting the peripheral refractory 14 needs to have a carbon content of 10% or more by mass. The MgO—C refractory constituting the peripheral refractory 14 preferably has a carbon content of 15% or more by mass. A MgO—C refractory with a carbon content of more than 25% by mass, however, has low abrasion resistance or erosion resistance and cannot have satisfactory durability. Thus, the MgO—C refractory constituting the peripheral refractory 14 needs to have a carbon content of 25% or less by mass.

The small metal tubes 20 may be made of any material and are preferably made of a metallic material with a melting point of 1300° C. or more. Examples of the metallic material with a melting point of 1300° C. or more include metallic materials (metallic elements and alloys) containing one or more of iron, chromium, cobalt, and nickel. A metallic material typically used for the small metal tubes 20 may be stainless steel (ferritic, martensitic, or austenitic), plain steel, or heat-resistant steel. The small metal tubes 20 preferably have an inner diameter in the range of 1 to 4 mm. It may be difficult to supply sufficient gas for stirring molten metal in the furnace through the small metal tubes 20 with an inner diameter of less than 1 mm. On the other hand, molten metal may flow into and block the small metal tubes 20 with an inner diameter of more than 4 mm. The small metal tubes 20 have a wall thickness in the range of approximately 1 to 2 mm.

The number of the small metal tubes 20 to be buried in the carbon-containing refractory is not particularly limited and is appropriately determined according to the required gas injection rate and the area of the operating portion. In furnaces that require a high flow rate, such as converters, approximately 60 to 250 of the small metal tubes 20 are buried. For a low gas injection rate in electric arc furnaces, ladles, and the like, one to tens of the small metal tubes 20 are buried.

Next, a method for producing a gas injection nozzle refractory according to the disclosed embodiments is described below. The carbon-containing refractories (the central refractory 12 and the peripheral refractory 14), which are composed mainly of an aggregate, a carbon source, metal Al, and metal Si, may contain other additive materials and binders.

The aggregate in the carbon-containing refractories may be magnesia, alumina, dolomite, zirconia, chromia, or spinel (alumina-magnesia or chromia-magnesia). In the disclosed embodiments, magnesia is used as a main aggregate from the perspective of resistance to molten metal and molten slag.

The carbon source in the carbon-containing refractories is not particularly limited and may be flake graphite, expanded graphite, earthy graphite, calcined anthracite, petroleum pitch, or carbon black. The amount of the carbon source to be added is determined according to the carbon contents of the central refractory 12 and the peripheral refractory 14. Examples of the additive materials other than the aggregate, the carbon source, metal Al, and metal Si include metal species, such as Al—Mg alloys, and carbides, such as SiC and $B_4C$. One or more of these may be used. The amounts of these additive materials are typically 3.0% or less by mass.

The raw materials of the carbon-containing refractories typically include a binder. The binder may be a typical binder for shaped refractories, such as phenolic resin or liquid pitch. The amount of the binder ranges from approximately 1% to 5% by mass (with respect to 100% of each refractory excluding the binder).

The gas injection nozzle refractory 10 according to the disclosed embodiments may be produced by a known method. Although one exemplary production method is described below, the disclosed embodiments are not limited to this method. First, the refractory raw materials of the central refractory 12 and the refractory raw materials of the peripheral refractory 14 are independently mixed in a mixer to prepare mixtures. After the small metal tubes 20 are placed at predetermined positions in the mixture for the central refractory 12, the mixture is shaped by uniaxial pressing to produce the central refractory 12 with the small metal tubes 20 buried therein. The central refractory 12 is then surrounded with and integrated by isostatic pressing (CIP) with the mixture for the peripheral refractory 14 to form a base material for the gas injection nozzle refractory 10. The base material is subjected to a predetermined heat treatment, such as drying, by a routine method. If necessary, the external shape may be appropriately adjusted.

A compression molding method for the central refractory 12 may be a multi-stage compression molding method including first pressing a small amount of the mixture in a frame, placing the small metal tubes 20 at predetermined positions on the mixture, charging the frame with a predetermined amount of the mixture, pressing the mixture, and repeatedly performing the placing, charging, and pressing, or a single compression molding method including pressing the whole amount of the mixture only once while holding each end of the small metal tubes 20 such that the small metal tubes 20 move with the mixture while pressing. The small metal tubes 20 may be joined to a gas reservoir portion by welding after the formation of the central refractory 12, after the molding of the base material, or after the heat treatment of the base material, or by placing the small metal tubes 20 with the top surface plate of the gas reservoir portion welded in advance in the mixture for the central refractory 12 when the central refractory 12 is molded. The raw materials of the carbon-containing refractories may be kneaded by any method, for example, by a kneading means used as a kneading apparatus for shaped refractories, such as a high-speed mixer, a tire mixer (Corner mixer), or an Eirich mixer. The mixture may be molded by a uniaxial molding machine, such as a hydraulic press or a friction press, or a pressing machine used for the molding of a refractory, such as isostatic pressing (CIP). The molded carbon-containing refractories may be dried at a temperature in the range of 180° C. to 350° C. for approximately 5 to 30 hours.

EXAMPLES

Example 1

The following are evaluation results of the resistance to molten steel of a MgO—C refractory used as a central refractory in a gas injection nozzle refractory according to the disclosed embodiments. Tables 1 and 2 list the raw material composition of refractory samples. Refractory samples 30 mm square and 160 mm in length (samples according to the disclosed embodiments and comparative samples) were prepared from the raw material compositions listed in Tables 1 and 2. These refractory samples were immersed in molten steel (SS400) in a high-frequency eccentric furnace at 1650° C. for 30 minutes, and the remaining thickness was measured. The amount of wear was determined from the difference between the thickness before the test and the thickness after the test.

To evaluate slaking resistance, 25 mm×25 mm×25 mm refractory samples (samples according to the disclosed embodiments and comparative samples) were prepared from the raw material compositions listed in Tables 1 and 2. After heat treatment at 1000° C. for 3 hours in coke breeze and treatment in a steam atmosphere at 100° C. for 3 hours, these refractory samples were checked for cracks. The presence of cracks was judged by visual inspection. Tables 1 and 2 also show these results. A comparison between Examples 3 to 5 and Comparative Example 9 shows that the samples according to the disclosed embodiments (MgO—C refractories that satisfy the conditions for a central refractory according to the disclosed embodiments) had significantly improved resistance to molten steel by the addition of metal Al. It was confirmed that the samples according to the disclosed embodiments also had high slaking resistance and had no crack as in the refractory (Comparative Example 1) normally used for tuyere refractories.

On a plane of the gas injection nozzle refractories, a virtual circle with a minimum radius surrounding all the buried small metal tubes had a radius R of 50 mm. The radius R+r of the central refractory was altered in the range of r=5 to 200 mm.

The small metal tubes buried in the carbon-containing refractory are plain steel or small stainless steel (SUS304) tubes with an outer diameter of 3.5 mm and an inner diameter of 2.0 mm.

Refractory raw materials were mixed at ratios listed in Tables 3 to 6 and were kneaded in a mixer. The small metal tubes were placed in the mixture for the central refractory. The central refractory was molded by uniaxial pressing. The central refractory was surrounded with the mixture for the peripheral refractory, and the base material was formed by CIP. The base material was then dried by a routine method to obtain a product.

TABLE 1

| | | Number of sample according to disclosed embodiments | | | | | | | | | |
|---|---|---|---|---|---|---|---|---|---|---|---|
| | | 1 | 2 | 3 | 4 | 5 | 6 | 7 | 8 | 9 | 10 |
| Raw material components of refractory (mass %) | MgO | 30 | 30 | 30 | 30 | 30 | 30 | 60 | 50 | 20 | 20 |
| | Dolomite | | | | | | | | | | |
| | Spinel ($Al_2O_3$—MgO) | | | | | | | | | | |
| | Flake graphite | 70 | 70 | 70 | 70 | 70 | 70 | 40 | 50 | 80 | 80 |
| | Expanded graphite | | | | | | | | | | |
| | Calcined anthracite | | | | | | | | | | |
| | Phenolic resin *1 | 3 | 3 | 3 | 3 | 3 | 3 | 3 | 3 | 3 | 3 |
| | Metal Al *1 | 3.0 | 5.0 | 5.5 | 6.0 | 6.5 | 7.0 | 5.0 | 5.0 | 5.0 | 6.0 |
| | Metal Si *1 | 1.5 | 3.0 | 3.3 | 3.6 | 3.9 | 4.2 | 4.0 | 1.6 | 1.6 | 2.0 |
| | Metal Si/Metal Al (mass ratio) | 0.50 | 0.60 | 0.60 | 0.60 | 0.60 | 0.60 | 0.80 | 0.32 | 0.32 | 0.33 |
| Resistance to molten steel | Wear (mm) | 1.7 | 1.6 | 1.4 | 1.2 | 1.5 | 1.0 | 1.6 | 1.4 | 1.9 | 1.8 |
| Slaking resistance | Presence of crack | No | No | No | No | No | No | No | No | No | No |

*1 With respect to 100% of refractory excluding the component

TABLE 2

| | Comparative sample No. | 1 | 2 | 3 | 4 | 5 | 6 | 7 | 8 | 9 |
|---|---|---|---|---|---|---|---|---|---|---|
| Raw material components of refractory (mass %) | MgO | 80 | 80 | 30 | 30 | 30 | 30 | 10 | 60 | 30 |
| | Dolomite | | | | | | | | | |
| | Spinel ($Al_2O_3$—MgO) | | | | | | | | | |
| | Flake graphite | 20 | 20 | 70 | 70 | 70 | 70 | 90 | 40 | 70 |
| | Expanded graphite | | | | | | | | | |
| | Calcined anthracite | | | | | | | | | |
| | Phenolic resin *1 | 3 | 3 | 3 | 3 | 3 | 3 | 3 | 3 | 3 |
| | Metal Al *1 | 0 | 3.0 | 5.0 | 4.5 | 4.5 | 3.0 | 6.0 | 0 | 0 |
| | Metal Si *1 | 0 | 0.5 | 1.0 | 0 | 1.0 | 0 | 1.5 | 0 | 0 |
| | Metal Si/Metal Al (mass ratio) | — | 0.17 | 0.20 | 0 | 0.22 | 0 | 0.25 | — | — |
| Resistance to molten steel | Wear (mm) | 1.1 | 1.5 | 1.3 | 1.6 | 1.7 | 1.2 | 1.4 | 4.5 | 10.7 |
| Slaking resistance | Presence of crack | No | Yes | Yes | Yes | Yes | Yes | Yes | No | No |

*1 With respect to 100% of refractory excluding the component

Example 2

As illustrated in FIG. 1, a gas injection nozzle refractory with 81 concentric small metal tubes was produced. Tables 3 to 6 list the production conditions for gas injection nozzle refractories.

The prepared gas injection nozzle refractories according to the examples and comparative examples were used for furnace bottom bricks around a bottom blowing tuyere of a 250-ton converter. After 2500 charges, the wear rate (mm/h) was determined from the remaining thickness of the refractory, and the wear rate ratio (index) was calculated relative to the wear rate of Comparative Example 1, which was set to "1". Slaking resistance was determined by visual inspection for cracks one week after use.

Tables 3 to 6 also show these results. Tables 3 to 6 show that in an actual converter that receives large thermal shocks the gas injection nozzle refractories according to the examples had a lower wear rate and higher durability than the gas injection nozzle refractories according to the comparative examples. No crack was formed as in ordinary Comparative Example 1, showing that the addition of metal Al had no adverse effects on slaking resistance. Among the examples, the gas injection nozzle refractories with a central refractory radius in the range of R+40 to R+70 mm had particularly high durability. In Comparative Example 18, the amount of added metal Al was increased. Although Comparative Example 18 had almost the same wear rate and slaking resistance as the examples, the gas injection nozzle refractory is expensive due to the large amount of added metal Al and may generate ammonia, which poses a safety problem.

TABLE 3

| | Example No. | 1 | 2 | 3 | 4 | 5 | 6 | 7 | 8 | 9 | 10 |
|---|---|---|---|---|---|---|---|---|---|---|---|
| Raw material components of central refractory (a) (mass %) | MgO | 50 | 50 | 50 | 50 | 50 | 40 | 30 | 25 | 30 | 30 |
| | Dolomite | | | | | | | | 5 | | |
| | Spinel ($Al_2O_3$—MgO) | | | | | | 10 | | | | |
| | Flake graphite | 40 | 40 | 50 | 48 | 48 | 50 | 70 | 70 | 70 | 70 |
| | Expanded graphite | | | | 2 | | | | | | |
| | Calcined anthracite | | | | | 2 | | | | | |
| | Phenolic resin *1 | 3 | 3 | 3 | 3 | 3 | 3 | 3 | 3 | 3 | 3 |
| | Metal Al *1 | 3.5 | 5.0 | 5.0 | 5.0 | 5.0 | 5.0 | 5.0 | 5.0 | 5.0 | 6.0 |
| | Metal Si *1 | 1.5 | 2.0 | 2.0 | 2.0 | 2.0 | 2.0 | 2.0 | 2.0 | 2.5 | 2.6 |
| | Metal Si/Metal Al (mass ratio) | 0.43 | 0.40 | 0.40 | 0.40 | 0.40 | 0.40 | 0.40 | 0.40 | 0.50 | 0.43 |
| Raw material components of peripheral refractory (b) (mass %) | MgO | 80 | 80 | 80 | 80 | 80 | 80 | 80 | 80 | 80 | 80 |
| | Flake graphite | 20 | 20 | 20 | 20 | 20 | 20 | 20 | 20 | 20 | 20 |
| | Expanded graphite | | | | | | | | | | |
| | Phenolic resin *1 | 3 | 3 | 3 | 3 | 3 | 3 | 3 | 3 | 3 | 3 |
| Number of small metal tubes (—) | Material plain steel | — | — | 81 | 81 | 81 | — | — | — | — | — |
| | Material SUS304 | 126 | 126 | — | — | — | 81 | 126 | 168 | 126 | 126 |
| | r (mm) | 50 | 50 | 50 | 50 | 50 | 60 | 60 | 70 | 60 | 60 |
| | Wear rate ratio (vs. Comparative example 1) | 0.65 | 0.54 | 0.57 | 0.56 | 0.58 | 0.57 | 0.55 | 0.59 | 0.57 | 0.54 |
| | Slaking resistance (presence of crack) | No | No | No | No | No | No | No | No | No | No |

*1 With respect to 100% of refractory excluding the component

TABLE 4

| | Example No. | 11 | 12 | 13 | 14 | 15 | 16 | 17 | 18 | 19 | 20 |
|---|---|---|---|---|---|---|---|---|---|---|---|
| Raw material components of central refractory (a) (mass %) | MgO | 30 | 20 | 50 | 50 | 50 | 50 | 50 | 50 | 40 | 50 |
| | Dolomite | | | | | | | | | | |
| | Spinel ($Al_2O_3$—MgO) | | | | | | | | | | |
| | Flake graphite | 70 | 80 | 50 | 50 | 50 | 50 | 50 | 50 | 60 | 50 |
| | Expanded graphite | | | | | | | | | | |
| | Calcined anthracite | | | | | | | | | | |
| | Phenolic resin *1 | 3 | 3 | 3 | 3 | 3 | 3 | 3 | 3 | 3 | 3 |
| | Metal Al *1 | 7.0 | 5.0 | 5.0 | 5.0 | 5.0 | 5.0 | 5.0 | 5.0 | 5.0 | 5.0 |
| | Metal Si *1 | 3.6 | 3.0 | 3.0 | 3.0 | 3.0 | 3.0 | 3.0 | 3.0 | 3.0 | 5.0 |
| | Metal Si/Metal Al (mass ratio) | 0.51 | 0.60 | 0.60 | 0.60 | 0.60 | 0.60 | 0.60 | 0.60 | 0.60 | 1.00 |
| Raw material components of peripheral refractory r(b) (mass %) | MgO | 80 | 80 | 80 | 80 | 80 | 88 | 85 | 75 | 80 | 80 |
| | Flake graphite | 20 | 20 | 20 | 20 | 20 | 10 | 15 | 25 | 20 | 20 |
| | Expanded graphite | | | | | | 2 | | | | |
| | Phenolic resin *1 | 3 | 3 | 3 | 3 | 3 | 3 | 3 | 3 | 3 | 3 |
| Number of small metal tubes (—) | Material plain steel | — | — | — | — | — | — | — | — | — | — |
| | Material SUS304 | 81 | 81 | 126 | 81 | 81 | 126 | 126 | 126 | 126 | 126 |
| | r (mm) | 40 | 40 | 10 | 100 | 150 | 10 | 10 | 10 | 40 | 10 |
| | Wear rate ratio (vs. Comparative example 1) | 0.55 | 0.59 | 0.58 | 0.54 | 0.58 | 0.59 | 0.57 | 0.57 | 0.58 | 0.59 |
| | Slaking resistance (presence of crack) | No | No | No | No | No | No | No | No | No | No |

*1 With respect to 100% of refractory excluding the component

TABLE 5

| Comparative example No. | | 1 | 2 | 3 | 4 | 5 | 6 | 7 | 8 | 9 | 10 |
|---|---|---|---|---|---|---|---|---|---|---|---|
| Raw material components of central refractory (a) (mass %) | MgO | 80 | 80 | 75 | 10 | 10 | 80 | 10 | 80 | 80 | 80 |
| | Dolomite | | | | | | | | | | |
| | Spinel ($Al_2O_3$—MgO) | | | | | | | | | | |
| | Flake graphite | 20 | 20 | 20 | 85 | 90 | 20 | 85 | 20 | 20 | 20 |
| | Expanded graphite | | | | 5 | | | 5 | | | |
| | Calcined anthracite | | | | | 5 | | | | | |
| | Phenolic resin *1 | 3 | 3 | 3 | 3 | 3 | 3 | 3 | 3 | 3 | 3 |
| | Metal Al *1 | 1.5 | 1.5 | 1.5 | 1.5 | 1.5 | 1.5 | 1.5 | 1.5 | 1.5 | 1.5 |
| | Metal Si *1 | 0.75 | 0.75 | 0.75 | 0.75 | 0.75 | 0.75 | 0.75 | 0.75 | 0.75 | 0.75 |
| | Metal Si/Metal Al (mass ratio) | 0.50 | 0.50 | 0.50 | 0.50 | 0.50 | 0.50 | 0.50 | 0.50 | 0.50 | 0.50 |
| Raw material components of peripheral refractory (b) (mass %) | MgO | 80 | 80 | 80 | 80 | 80 | 80 | 80 | 93 | 91 | 65 |
| | Flake graphite | 20 | 20 | 20 | 20 | 20 | 20 | 20 | 7 | 7 | 35 |
| | Expanded graphite | | | | | | | | | 2 | |
| | Phenolic resin *1 | 3 | 3 | 3 | 3 | 3 | 3 | 3 | 3 | 3 | 3 |
| Number of small metal tubes (—) | Material plain steel | 81 | — | — | — | 126 | 126 | 126 | — | — | — |
| | Material SUS304 | — | 81 | 126 | 126 | — | — | — | 126 | 126 | 126 |
| | r (mm) | 50 | 50 | 50 | 8 | 8 | 180 | 200 | 50 | 50 | 50 |
| | Wear rate ratio (vs. Comparative example 1) | 1.00 | 0.98 | 0.95 | 1.41 | 1.50 | 1.22 | 1.43 | 1.38 | 1.25 | 1.18 |
| | Slaking resistance (presence of crack) | No | No | No | No | No | No | No | No | No | No |

*1 With respect to 100% of refractory excluding the component

TABLE 6

| Comparative example No. | | 11 | 12 | 13 | 14 | 15 | 16 | 17 | 18 | 19 | 20 |
|---|---|---|---|---|---|---|---|---|---|---|---|
| Raw material components of central refractory (a) (mass %) | MgO | 50 | 50 | 50 | 10 | 50 | 50 | 50 | 30 | 30 | 30 |
| | Dolomite | | | | | | | | | | |
| | Spinel ($Al_2O_3$—MgO) | | | | | | | | | | |
| | Flake graphite | 50 | 50 | 50 | 90 | 50 | 50 | 50 | 70 | 70 | 70 |
| | Expanded graphite | | | | | | | | | | |
| | Calcined anthracite | | | | | | | | | | |
| | Phenolic resin *1 | 3 | 3 | 3 | 3 | 3 | 3 | 3 | 3 | 3 | 3 |
| | Metal Al *1 | 1.5 | 1.5 | 1.5 | 1.5 | 1.5 | 1.5 | 3.0 | 8.5 | 4.0 | 5.0 |
| | Metal Si *1 | 0.75 | 0.75 | 0.75 | 0.75 | 0.75 | 0.75 | 0.80 | 4.80 | 5.00 | 6.00 |
| | Metal Si/Metal Al (mass ratio) | 0.50 | 0.50 | 0.50 | 0.50 | 0.50 | 0.50 | 0.27 | 0.56 | 1.25 | 1.20 |
| Raw material components of peripheral refractory (b) (mass %) | MgO | 70 | 70 | 70 | 70 | 95 | 80 | 80 | 80 | 80 | 80 |
| | Flake graphite | 30 | 30 | 30 | 30 | 5 | 20 | 20 | 20 | 20 | 20 |
| | Expanded graphite | | | | | | | | | | |
| | Phenolic resin *1 | 3 | 3 | 3 | 3 | 3 | 3 | 3 | 3 | 3 | 3 |
| Number of small metal tubes (—) | Material plain steel | — | — | — | — | — | — | — | — | — | — |
| | Material SUS304 | 126 | 126 | 126 | 126 | 126 | 126 | 126 | 126 | 126 | 126 |
| | r (mm) | 50 | 160 | 5 | 50 | 50 | 50 | 50 | 50 | 50 | 50 |
| | Wear rate ratio (vs. Comparative example 1) | 0.90 | 1.07 | 1.06 | 1.40 | 1.27 | 1.42 | 0.95 | 0.66 | 1.10 | 1.07 |
| | Slaking resistance (presence of crack) | No | No | No | No | No | No | Yes | No | No | No |

*1 With respect to 100% of refractory excluding the component

The invention claimed is:

1. A gas injection nozzle refractory with at least one gas injection small metal tube buried in a carbon-containing refractory, the gas injection nozzle refractory comprising:
a central refractory with the at least one small metal tube buried therein, the central refractory being a MgO—C refractory with a carbon content in the range of 40% to 80% by mass, a metal Al content in the range of 3% to 8% by mass, and a mass ratio of a metal Si content to the metal Al content in the range of 0.30 to 1.0, and
a peripheral refractory surrounding the central refractory, the peripheral refractory being a MgO—C refractory with a carbon content in the range of 10% to 25% by mass, wherein the central refractory on a plane of the gas injection nozzle refractory has an external shape of a circle with a radius in the range of R+10 to R+150 mm concentric with a virtual circle with a minimum radius surrounding the at least one buried small metal tube, R mm being a radius of the virtual circle.

2. The gas injection nozzle refractory according to claim 1, wherein the external shape is a circle with a radius in the range of R+40 to R+70 mm concentric with the virtual circle.

3. The gas injection nozzle refractory according to claim 1, wherein the metal Al content is in the range of 5% to 7% by mass.

4. The gas injection nozzle refractory according to claim 1, wherein the metal Al content is in the range of 5% to 7% by mass, and the mass ratio of the metal Si content to the metal Al content is in the range of 0.30 to 0.45.

5. A gas injection nozzle comprising:
a working surface; and
a refractory microstructure including the gas injection nozzle refractory according to claim 1.

6. The gas injection nozzle refractory according to claim 2, wherein the metal Al content is in the range of 5% to 7% by mass.

7. The gas injection nozzle refractory according to claim 2, wherein the metal Al content is in the range of 5% to 7% by mass, and the mass ratio of the metal Si content to the metal Al content is in the range of 0.30 to 0.45.

8. A gas injection nozzle comprising:
a working surface; and
a refractory microstructure including the gas injection nozzle refractory according to claim 3.

9. A gas injection nozzle comprising:
a working surface; and
a refractory microstructure including the gas injection nozzle refractory according to claim 4.

10. A gas injection nozzle comprising:
a working surface; and
a refractory microstructure including the gas injection nozzle refractory according to claim 6.

11. A gas injection nozzle comprising:
a working surface; and
a refractory microstructure including the gas injection nozzle refractory according to claim 7.

12. The gas injection nozzle refractory according to claim 1, wherein the carbon content of the MgO—C refractory of the central refractory is in the range of 50% to 80% by mass.

* * * * *